United States Patent [19]
Mallinckrodt

[11] 3,836,886
[45] Sept. 17, 1974

[54] BEAMFORMER SCANNING SYSTEMS
[75] Inventor: Charles O. Mallinckrodt, Woodland Hills, Calif.
[73] Assignee: TRW Inc., Redondo Beach, Calif.
[22] Filed: Jan. 28, 1966
[21] Appl. No.: 523,670

[52] U.S. Cl................................ 340/6 R, 340/6 M
[51] Int. Cl............................................ G01s 3/80
[58] Field of Search ......... 340/6, 6 M, 16, 174.1 F, 340/174.1 H; 343/100.6; 179/100.2 CB, 100.2 CF, 100.2 CH; 174/68.5

[56] References Cited
UNITED STATES PATENTS

| | | | |
|---|---|---|---|
| 2,825,043 | 2/1958 | Abbott.................. | 340/16 |
| 2,876,296 | 3/1959 | Youngquist............ | 179/100.2 |
| 3,002,188 | 9/1961 | Abbott.................. | 343/100 |
| 3,039,079 | 6/1962 | Walters et al......... | 340/6 |
| 3,163,844 | 12/1964 | Martin.................. | 340/6 |
| 3,217,287 | 11/1965 | Knox..................... | 340/6 |

Primary Examiner—Richard A. Farley
Attorney, Agent, or Firm—Daniel T. Anderson; Jerry A. Dinardo; Edwin A. Oser

[57] ABSTRACT
Beamformer scanning systems having a magnetic signal recording medium and a plurality of magnetic recorders for recording transducer signals generated by a plurality of transducers arranged in an array on the recording medium in response to input signals received from a plurality of elevation angles through a transmission medium such as air, water or earth. Apparatus is provided for moving the recording medium adjacent to the recorders in a direction to produce magnetic tracks of the transducer signals on the recording medium. A magnetic reproducer scans the tracks for generating a predetermined number of output signals, the output signals each having an instantaneous amplitude equal to the algebraic sum of the instantaneous amplitudes of the transducer signals produced by one of the input signals. A variable speed motor is provided for moving the recording medium which can be operated either at a constant rotational speed to provide output signals at the predetermined beam angle elevations, or the speed can be varied over a selected range of speeds to steer the beams about the elevation angles. Additionally, provision is made for compensating the output signals so that the gain versus frequency characteristics will be substantially linear in a predetermined frequency band. Azimuth angle search can be achieved by the provision of apparatus for moving the magnetic reproducers laterally with respect to the magnetic tracks.

24 Claims, 20 Drawing Figures

Fig. 1.

Charles O. Mallinckrodt,
INVENTOR.
BY.
AGENT.

Charles O. Mallinckrodt,
INVENTOR.

BY.

Alfons Valubores
AGENT.

Charles O. Mallinckrodt,
INVENTOR.

BY.

AGENT.

Fig. 7.

Charles O. Mallinckrodt,
INVENTOR.
BY.
AGENT.

Charles O. Mallinckrodt,
INVENTOR.
BY.

*Alfons Valiukonis*
AGENT.

Charles O. Mallinckrodt,
INVENTION.
BY.

AGENT.

Fig. 20.

BEAMFORMER SCANNING SYSTEMS

This invention relates generally to scanning systems having application in radio direction finding, sonar, and seismology, and in particular to electronic scanning systems in which beamforming can be accomplished for predetermined angular elevation sectors, and for azimuth angles up to a complete 360° circle, rapidly, and without the use of rotatable antenna arrays.

The present invention involves the use of a magnetic recording medium and a plurality of magnetic recorders for recording transducer signals generated by a plurality of transducers arranged in an array on the recording medium in response to input signals received from a plurality of elevation angles through a transmission medium such as air, water or earth. Means are also provided for moving the recording medium adjacent to the recorders in a direction to produce magnetic tracks of the transducer signals on the recording medium. Magnetic reproducer means scans the tracks for generating a predetermined number of output signals, the output signals each having an instantaneous amplitude equal to the algebraic sum of the instantaneous amplitudes of the transducer signals produced by one of the input signals. Provision is made for the recording medium moving means to be a variable speed motor so that it can be operated either at a constant rotational speed to provide output signals at the predetermined beam elevation angles, or the speed can be varied over a selected range of speeds to steer the beams about the elevation angles. Additionally, apparatus is provided for compensating the output signals so that the gain versus frequency characteristics will be substantially linear in a predetermined frequency band. One embodiment of the invention provides means for moving the magnetic reproducers laterally with respect to the magnetic tracks to accomplish azimuth angle search.

Accordingly, one important object of the present invention is the provision of scanning apparatus capable of accomplishing beamforming for predetermined elevation and azimuth angles.

Another object of the present invention is the provision of scanning apparatus capable of generating a plurality of output signals each representing the algebraic addition of the instantaneous amplitudes of transducer signals produced by an input signal received at a predetermined elevation angle.

One other object of the present invention is the provision of scanning apparatus which is capable of steering beams about predetermined elevation and azimuth angles.

Still another object of this invention is the provision of scanning apparatus wherein output signals representing input signals received at predetermined elevation and azimuth angles are compensated so that the signal gain versus the frequency characteristics are substantially linear in a predetermined frequency band.

These and other objects of the invention will become more apparent in connection with the following description of the several embodiments of the invention selected for illustrative purposes and illustrated in the accompanying drawings in which:

Figure 1:
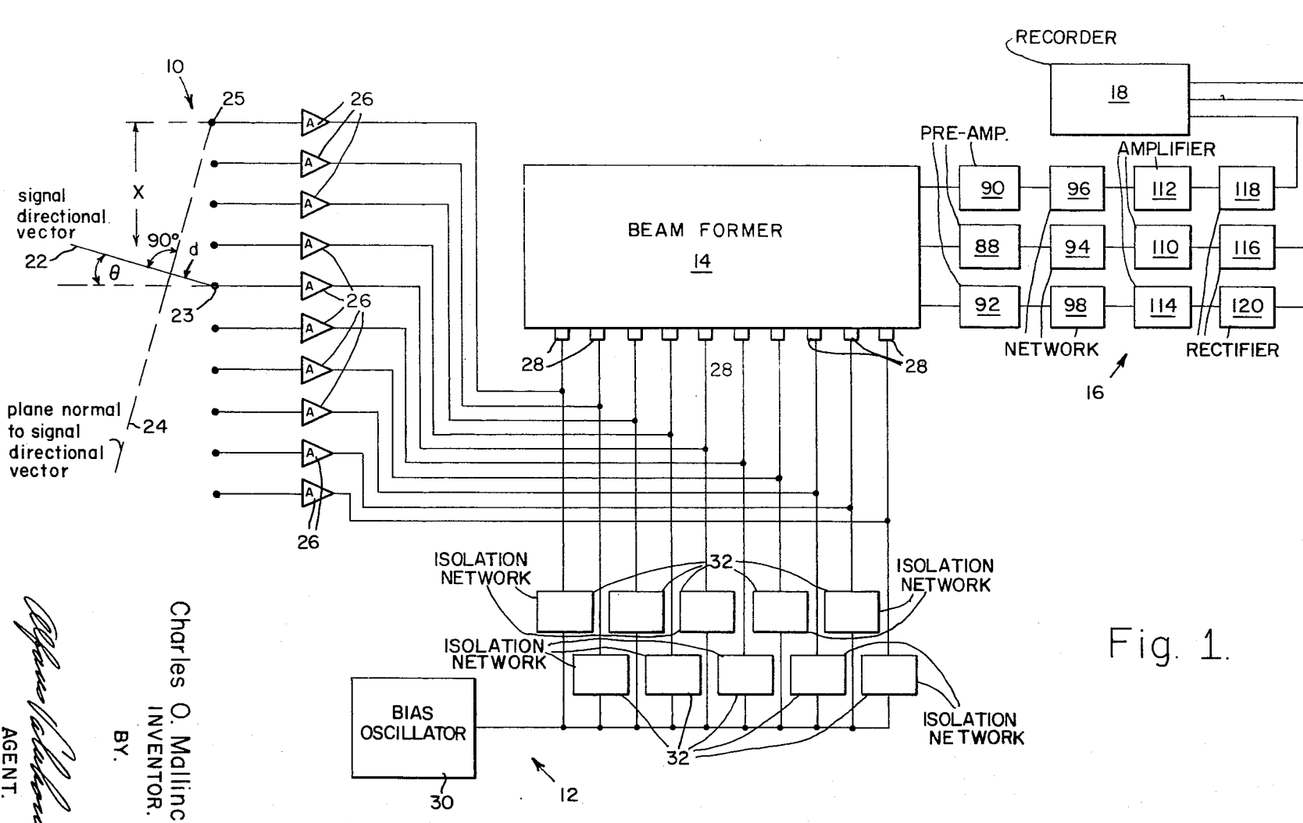
FIG. 1 is a showing of a block diagram of the apparatus of one embodiment of the present invention.
Figure 2:
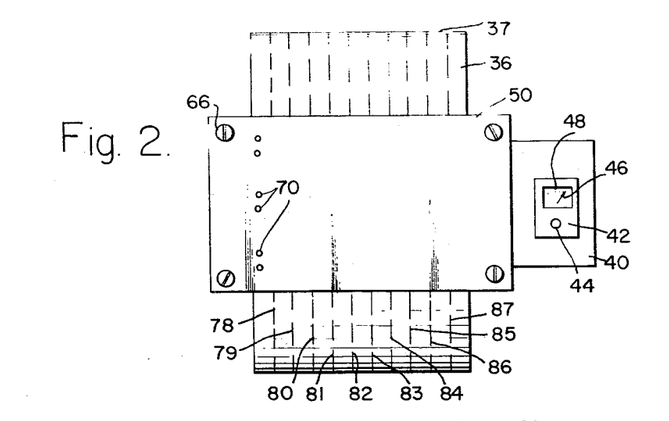
FIGS. 2, 3, and 4 show plan, side and end views, respectively, of the novel beamformer of the apparatus of FIG. 1.
Figure 3:
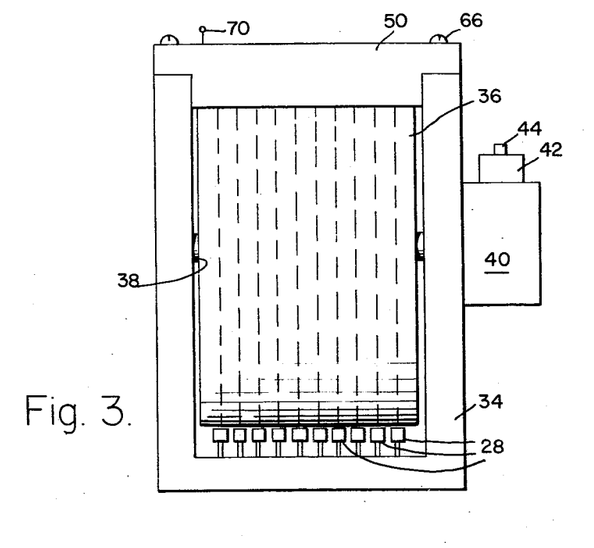
Figure 4:
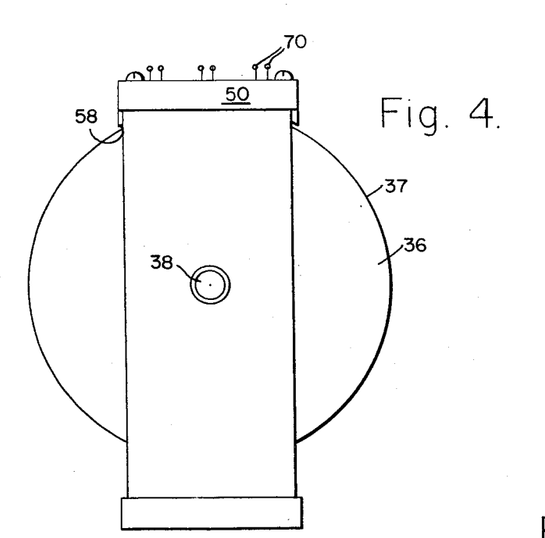

Referring to FIG. 1 wherein there is shown scanning apparatus incorporating a preferred embodiment of the present invention, the numeral 10 designates an array of transducers that is connected by means of an input circuit 12 to a beamformer 14 whose output is passed through an output circuit 16 and then to a recorder 18.

The array 10 consists of a plurality of transducers shown for convenience as dots uniformly spaced along a straight line. As illustrated, the transducer array 10 is positioned within a transmission medium with its axis in a vertical position. The active elements of the transducers are similar and can be short tubes of piezoelectric material having axes conciding with the line axis of the array 10. The direction of travel of a received acoustic signal, for example, is represented by a signal vector 22 that lies in the plane of the drawing and passes through one of the transducers 23 located adjacent to the center of the array 10. The tilt or elevation angle of the signal 22 is designated θ. For the purposes of the present invention it will be assumed that the source of the acoustic signal 22 is far enough from the array 10 so that any wavefront sphericity effects can be neglected. The time that the signal 22 is received by the transducer 25 which is located at the top of the array will be taken as a reference time. Accordingly, the time $T_a$, or acoustical delay time, that the signal is received by transducer 23 with respect to transducer 25, would be given by $$T_a = d/c \qquad (1)$$

where $d$ is the distance that a transducer such as the transducer 23 is located from a plane designated by dashed line 24 which is drawn through the topmost reference transducer 25 normal to the signal direction vector 22; and c is the velocity of sound in the transmission medium. For the array configuration shown in FIG. 1, the delay time $T_a$ can be expressed more generally for all the transducers of the array as $$T_a = x/c \sin \theta \qquad (2)$$

where $x$ is the distance that a given one of the transducers of the array 10 is located from the reference transducer 25; and $\theta$ is the elevation angle of the input signal 22.

The input circuit 12 consists of a plurality of amplifiers 26 each being connected to receive signals from one of the transducers and to provide signals to one of a plurality of magnetic recording heads 28 of the beamformer 14. The amplifiers 26 are conventional and need only provide output signals which are sufficient to drive the recording heads 28 of the beamformer 14. An oscillator 30 is provided which supplies the usual AC biasing current to each recorder 28 to linearize the recording of signals. The biasing current generated by the oscillator 30 should be several times greater than the maximum signal currents produced by the amplifiers 26, and its frequency normally should be about one order of magnitude greater than that of the highest frequency component of the amplifier input signals. The biasing current produced by the oscillator 30 is distributed to the recording heads through isolation networks 32 which could consist of series RLC networks each having a resonant frequency equal to that of the oscillator 30.

Referring to FIGS. 2, 3, 4, and 5, wherein there is shown the details of the beamformer 14 as consisting of a base 34 having a cylindrical drum 36 rotatably supported therein by means of a shaft 38 extending lengthwise through the center of the drum and mounted in the base 34. The drum 36 is a metallic cylinder the surface 37 of which is coated with a thin layer of magnetic recording material, such as a ferrite powder mixed with a suitable binder. A suitable motor 40 is supported on the base 34 and drives the drum 36 through the shaft 38. A speed controller 42 is mounted on the motor 40 and has a manually adjustable member such as a knob 44 for controlling the speed of the motor. A speed indicator 46 is provided on the speed controller that has a dial 48 calibrated in terms of revolutions per second for a purpose to be hereinafter more clearly described.

The magnetic recorders 28 are conventional and equal in number to the number of transducers in the array 10. For convenience, it is desirable that the recorders 28 be aligned so that they lie on a line parallel to the axis of the drum 36. The recorders 28 are suitably rigidly mounted on the base 34 so as to maintain a clearance of the order of several mils between their pole pieces and the drum surface 37.

A block of material indicated by the numeral 50 serves as a support for a plurality of novel magnetic reproducers in the form of printed circuits 52, 54, and 56. The block 50 may preferably wholly consist of suitable electrical insulating material, as shown, or it may consist of insulating material bonded to a metallic supporting member. The lower surface 58 of the block 59 is curved so that it conforms to the surface 37 of the drum 36. Edges 60 and 62 are provided on both ends of the block 50 with suitable holes 64 therethrough so that the block 50 can be suitably mounted on the base 34 by means of bolts 66. The block 50 is rigidly mounted on the base so that there is sufficient clearance between the printed circuits 52, 54, and 56 and the drum surface 37 to prevent any physical contact during drum rotation. A plurality of holes 68 in the curved undersurface 58 of the block through the block provide a means for leading the ends of the printed circuits 52, 54, 56 to terminals 70 on the top of the block.

Figure 5:
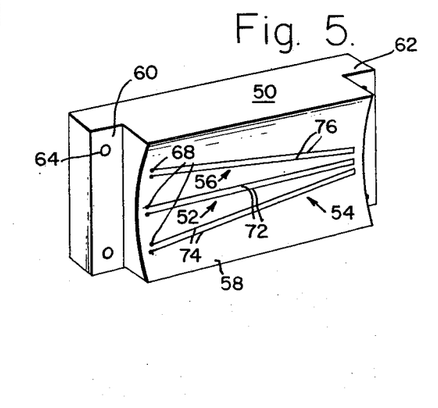
FIG. 5 is a perspective view showing details of the block and printed circuits of the beamformer of FIGS. 2 – 4.
Figure 6:
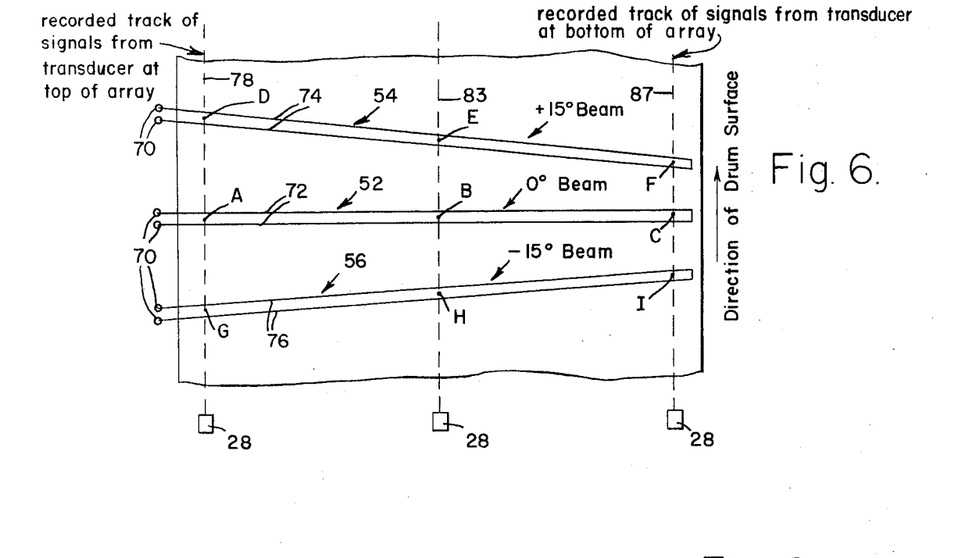
FIG. 6 is an enlarged diagram showing in plan of the relationship of the drum and printed circuits of the beamformer of FIGS. 2 – 5.

As shown in FIGS. 5 and 6, the three printed circuits 52, 54, and 56 are bonded to the curved surface 58 of the block 50 and serve to form beams having the elevation angles 0°, +15°, and −15°, respectively. It is to be understood that this is by way of illustration only and that the actual number of printed circuits employed would be equal to the number of beams at prescribed elevation angles that it is desired to simultaneously form. The printed circuits 52, 54, and 56 are rectangularly shaped loops of rectangular cross section wire having pairs of similar substantially parallel straight sides 72, 74, and 76, respectively. The sides 72, 74, and 76 are each connected together at one end and connected to the terminals 70 at the other end. Each of the printed circuits 52, 54, and 56 spans the drum 36 to traverse all of the recorded equally spaced tracks 78 – 87. As illustrated in FIG. 6, the printed circuit 52 traverses the magnetic tracks 78, 83, and 87 such that points A, B, and C, respectively, define points of intersection of the tracks and an imaginary parallel line positioned between and equidistant from the sides 72. Similar points of intersection D, E, and F with the tracks 78, 83, and 87 are shown for the printed circuit 54. The points G, H, and I indicate similar points for the printed circuit 56. Each of the printed circuits 52, 54, and 56 is capable of simultaneously scanning all of the magnetic tracks for recorded transducer signals produced by the input signals, and has induced therein due to motion of the drum 36 an output signal having an instantaneous maximum value equal to the algebraic sum of the instantaneous amplitudes of the transducer signals produced by the input signals received at elevation angles 0°, +15° and −15°, respectively. In order for the output signals to be thus maximized in value each of the differently delayed magnetic transducer signals recorded on the tracks 78 – 87 representing an input signal is made to induce its share of output signal voltage at the same time as the other recorded transducer signals rpresenting the same input signal. More specifically, additional electrical time delay $T_e$ is provided for each of the differently acoustically time delayed transducer signals to achieve this time equalization according to the expression $$T_e = T_m - T_a \qquad (3)$$

where $T_m$ is an arbitrary fixed value of time great enough so that $T_e$ is positive for all values of $T_a$ obtained from equation (2). From equation (2) equation (3) can be rewritten in convenient general form as $$T_e = T_m - x/c \sin \theta \tag{4}$$

where $x$, $c$, and $\theta$ are as defined with respect to equation (2). The above required time equalization in this embodiment of the invention is achieved by locating each of the points A–I along its track at a distance $Y_1$ from a recorder 28 which can be obtained from $$Y_1 = vT_e = v (T_m - x/c \sin \theta) \tag{5}$$

where $T_e$, $T_m$, $x$, and $c$ are as hereinbefore defined with respect to equations (1) to (4); and $v$ is the velocity of the surface 37 of the drum 36.

Figure 7:
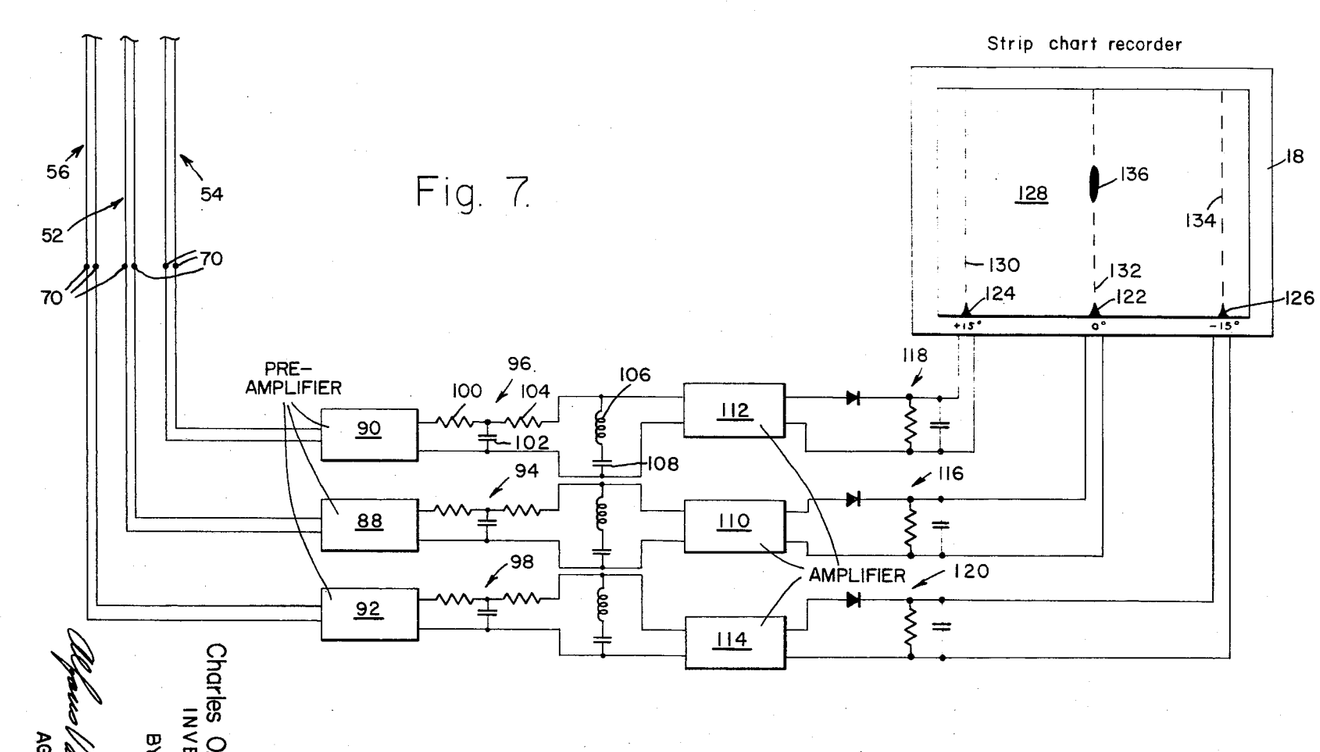
FIG. 7 is a part block diagram and a part schematic showing of the output circuit and recorder of the apparatus of FIG. 1.

Referring to FIGS. 1 and 7, the output circuit 16 is shown as consisting of a plurality of preamplifiers 88, 90, and 92 connected to the terminals 70 of the printed circuits 52, 54, and 56, respectively, and connected to provide outputs to similar equalizing networks 94, 96, and 98, respectively. The equalizing networks 94, 96, and 98 each consists of a first section having a series resistor 100 and a shunt capacitor 102. A second section of each equalizing circuit consists of a series resistor 104 and a series shunt arrangement of an inductance 106 and a capacitor 108. The outputs from the equalizing networks 94, 96, and 98 are fed to output amplifiers 110, 112, 114, respectively, and then through rectifier circuits 116, 118, and 120 before being recorded.

The recorder 18 is shown as a strip chart recorder which receives each of the signals provided by the rectifiers 116, 118, and 120 to drive the styli 122, 124, 126 of the recorder, respectively. The chart 128 of the recorder 18 is adapted for upward movement at a constant speed. The presence of a received input signal at any one of the selected elevation angles 0°, +15° or −15° is indicated by the darkening of one of the traces 130, 132, 134 on the chart, as shown, for example, at 136.

Figure 8:
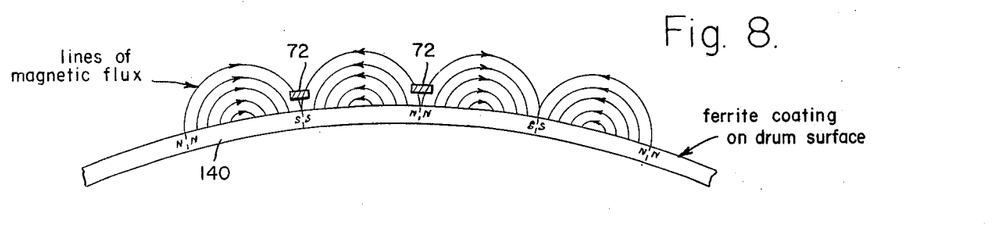
FIG. 8 is an enlarged showing in cross section elevation of the relationship of the magnetic recording material of the drum and one of the printed circuits of the beamformer of FIGS. 2 – 6.
Figure 9:
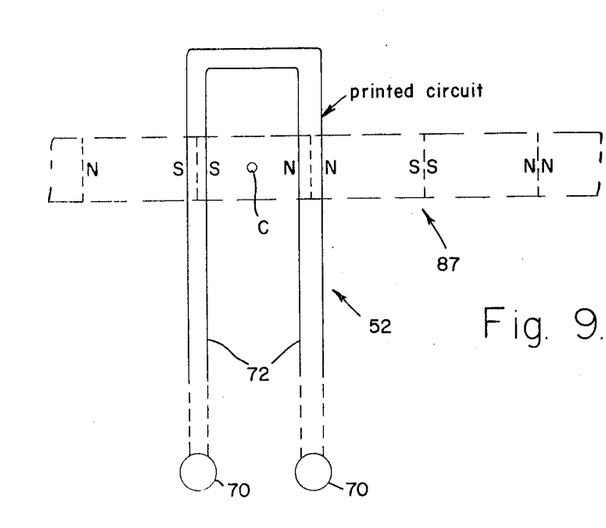
FIG. 9 is an enlarged showing of the relationship in plan of the printed circuit of FIG. 8 and one of the magnetic tracks.

Operation of the embodiment of the invention illustrated in FIGS. 1 – 7 can best be understood with reference to FIGS. 8 and 9. Referring to FIG. 8 in particular, there is shown an enlarged cross section view of the magnetic recording material 140 in elevation on a small portion of the drum surface 37 in the region of one of the recorded tracks 87. The magnetic condition of the coating 140 can be visualized as consisting of a series of areas which are alternately poled N-S and S-N. The N-S magnetized areas are produced by positive half cycles of a transducer signal and the S-N areas by the negative half cycles of the transducer signal. The lines of magnetic flux which exist above the surface 37 of the drum 36 are designated by the solid lines showing the directions of the magnetic fields. A cross section view of the two parallel sides 72 of the printed circuit 52, for example, are shown positioned above the drum surface. FIG. 9 shows the magnetized areas of the track 87 as viewed looking downward at the drum surface 37 along with a portion of the printed circuit 52 which traverses the track 87.

Because of the relative motion between the magnetized area of the drum surface 37 and the printed circuit 52, an instantaneous electromotive force V is induced in the printed circuit given by $$V = E\cos [\omega(t - T_2 + T_1/2)] - E\cos [\omega(t - T_2 - T_1/2)] \tag{6}$$

Where E is the peak voltage induced in either wire 72; $\omega$ is the frequency of the recorded transducer signal in radians per second; $t$ is time in seconds; $T_1$ is the amount by which the portion of voltage V induced in the printed circuit wire 72 farthest from the recording head 28 is delayed relative to the portion of voltage V induced in the wire 72 nearest the recording head 28; and $T_2$ is the time required for the recorded transducer signal on the surface 37 of the drum 36 to be transported from the recording head 28 to the point C midway between the two printed circuit wires 72. The above equation (6) may be rewritten $$V = -2 E\sin [\omega(t - T_2)] \sin (\omega T_1/2) \tag{7}$$

Replacing $\omega$, $T_1$ and $T_2$ in the above equation (7) with $$\omega = 2\pi v/\lambda$$
$$T_1 = a/v$$
$$T_2 = Y_1/v$$

where $v$ is the velocity of the drum surface 37; $a$ is the distance between the two printed circuit wires, center to center, and is approximately equal to half the wavelength $\lambda$; $\lambda$ is the wavelength of the recorded signal as measured on the surface 37 of the drum 36; and $Y_1$ is the distance of point C from the recording head 28 along the track 87, as hereinbefore equated in equation (5), results in $$V = -2E\sin [2\pi v/\lambda (t - Y_1/v)] \sin \pi a/\lambda \tag{8}$$

The induced output voltage V as expressed in the above equation (8) is directly proportional to the magnitude of the vertical component $H_y$ of the magnetic field. If it is assumed that the width of the recording track 87 is large compared with the distance between the printed circuit 52 and the drum surface 37, that the layer of magnetic material 140 on the surface 37 of the drum 36 is very thin compared to the distance between the printed circuit 52 and the drum surface 37, and that the intensity of magnetization which is produced in the magnetic material 140 on the drum surface 37 by the recording head 28 is directly proportional to the signal current in the recording head 28, the vertical component $H_y$ of the magnetic field strength is given by $$H_y = (k_1 I\omega/v)(e^{-\omega\ h/v}) \tag{9}$$

where $h$ is the distance between the printed circuit 52 and the drum surface 37; $v$ is the velocity of the drum surface 37; I is the signal current in the recording head 28; $k_1$ is a constant having a predetermined value dependent on the desired parameters of an operational embodiment of the beamformer; and $\omega$ is the frequency of the recorded transducer signal in radians per second.

The significance of the exponential term in the above equation (9) becomes clearer by replacing ω with the expression $$\omega = 2\pi v/\lambda$$

in equation (9) to give $$H_y = (2\pi I k_1/\lambda)(e^{-2\pi\ h/\lambda})$$

(10)

The exponential term of equation (10) reveals that when $h$ is equal to $\lambda$, the printed circuit output voltage V as given by equation (8) becomes smaller by a factor $e^{-2\pi}$, or 54.5db, than when the ratio of $h$ to $\lambda$ is zero. For other values of $h$, the printed circuit output voltage V becomes smaller by $h/\lambda$ multiplied by 54.5db. The complete equation for the printed circuit output voltage $V_1$ can then be expressed by combining equations (8) and (10) to give $$V_1 = -2 E \sin [2\pi v/\lambda(t-Y_1/v)] (\sin \pi a/\lambda)(2\pi I k_1/\lambda)(e^{-2\pi\ h/\lambda})$$

(11)

It will be appreciated that simultaneously with the induction of a voltage $V_1$ in the printed circuit 52 by the magnetic field of the track 87, as hereinbefore set forth, there will be additional similar electromotive forces induced in the printed circuit by the magnetic fields of the other tracks 78 – 86, resulting in an algebraic summation of voltages representing the recorded transducer signals produced by all of the transducers of the array 10 in response to an input signal received at an elevation angle of 0°. After amplification by the preamplifier 88 the algebraically summed voltages are frequency compensated for by the equalizing network 94 which produces in its output a signal having a substantially linear gain versus frequency characteristic within the desired frequency band. If the ratio of $h$ (the distance between the printed circuit 52 and the drum's surface 37) to $\lambda$ (the wavelength of the recorded signal as measured on the surface 37 of the drum 36) is very small within the desired frequency band, the first section of the equalizing network consisting of the resistor 100 and the shunt capacitor 102, and the second section consisting of the resistor 104, inductor 106, and capacitor 108, produces the desired frequency compensation of the signal output. Frequency compensation is readily achieved by providing for the resistances of the resistors 100 and 104 and the input impedance of the output amplifier 110 to be very large in value compared to the impedances of the shunt capacitor 102, and the resonant circuit consisting of the inductor 106 and capacitor 108. The signal from the amplifier 110 is rectified by the rectifier 116 and then serves to drive the stylus 122 on the recorder 18 which darkens the moving chart 128 at 136 when a signal is received.

Similarly algebraically summed voltages representing recorded transducer signals produced by all of the transducers of the array 10 in response to input signals received at elevation angles +15°, and −15°, are induced in the printed circuits 54 and 56, respectively. The voltages thus induced in the printed circuits 54 and 56 are fed to the preamplifiers 90 and 92 and then to the equalizing networks 96 and 98, respectively, wherein they are frequency compensated. The amplifiers 112 and 114 amplify the voltage signals from the equalizing networks 96 and 98, respectively, which are then rectified by the rectifiers 118 and 120 and the signals are then utilized to drive the styli 124 and 126 to darken the moving chart 128 in a manner similar to the mark 136 when voltages are induced in the printed circuit 52.

Figure 10:
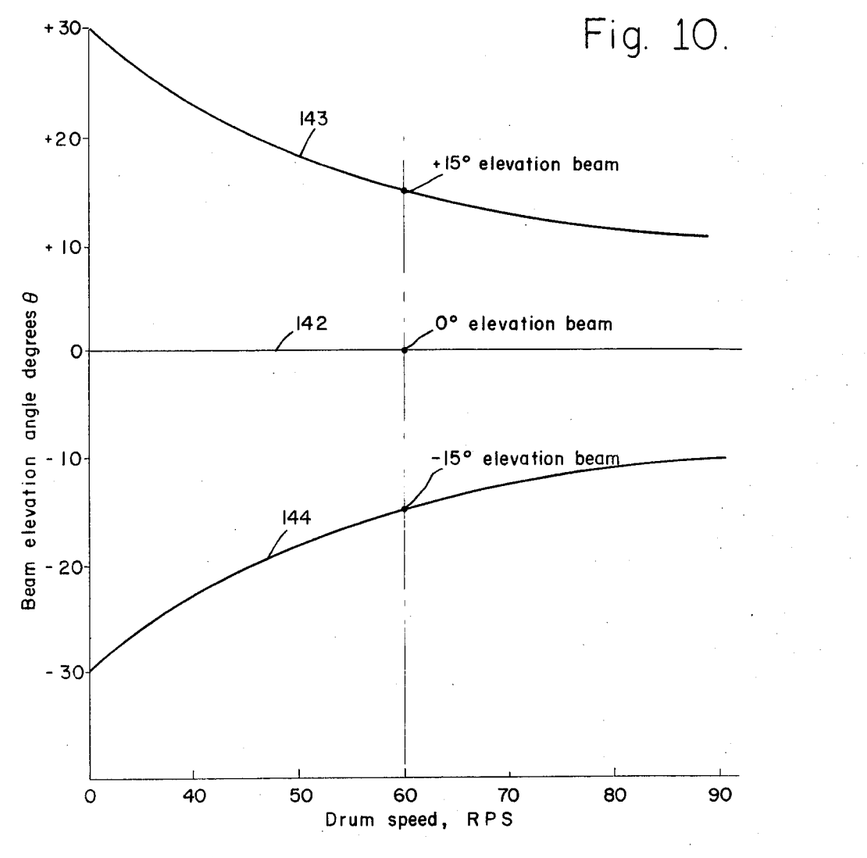
FIG. 10 shows graphical representations of how the beam elevation angles of the printed circuits of the beamformer of FIGS. 2 – 6 vary with drum speed.

FIG. 10 graphically depicts how beam steering or searching in elevation can be readily achieved with the system of the invention shown in FIGS. 1 – 7. Numerals 142, 143, and 144 designate curves representing how the beam elevation angles of 0°, +15° and −15°, formed by the printed circuits 52, 54, and 56 for a drum 36 rotational speed of sixty revolutions per second, vary with drum speed. Referring to curve 142 it can be seen that increasing or decreasing the rotational speed of drum 36 by means of speed controller 42 beyond the speed of 60 revolutions per second does not serve to form any beams in elevation either above or below 0° of angular elevation. On the other hand, viewing curve 143 it is clearly apparent that in the case of the +15° beam formed by the printed circuit 54, for example, an increase in the speed of the drum 36 above sixty revolutions per second serves to form beams at elevation angles varying from +15° to approximately +10°. A decrease in the speed of the drum, however, serves to increase the elevation angles of the beams formed to approximately +30° at a drum speed of 30 revolutions per second. Similarly, the curve 144 shows that the −15° beam formed by the printed circuit 56 at a drum speed of 60 revolutions per second decreases in negative beam angle of elevation with an increase in drum speed and increases in negative angle of elevation with a decrease in drum speed.

The following table provides the dimensions, parameters, and characteristics of an operational embodiment of the scanning system of FIGS. 1 – 7.

TABLE I

| | |
|---|---|
| Number of transducers | 25 |
| Length of array 10 (distance from center of the transducer at the bottom of the array to the center of the transducer at the top of the array) | 15 ft. |
| Number of beams to be formed simultaneously at elevation angles of +15°, 0°, and −15° | 3 |
| Center frequency of the generated acoustic signal | 4 Kc |
| Wavelength of the generated acoustic signal, at 4 Kc, assuming the velocity of propagation in sea water, for example, is 5000 ft. per second | 1.25 ft. |
| Bandwidth of the generated acoustic signal | 400 cps. |
| Distance between centers of adjacent transducers | 0.625 ft. |
| Diameter of beamforming drum 36 | 4.25 in. |
| Length of drum 36 | 5.00 in. |
| Speed of rotation of drum 36 | 60 rps. |
| Velocity of drum surface 37 | 800 in./sec. |
| Wavelength of recorded 4.0 Kc signal, as measured on the drum surface 37 | 0.2 in. |
| Clearance between the printed circuits 52, 54, and 56 and surface 37 of drum 36 | 0.02 in. |
| Width of printed circuit wires 72, 74, 76 | 0.01 in. |
| Thickness of printed circuit wires 72, 74, 76 | 0.004 in. |

TABLE I-Continued

| | |
|---|---|
| Spacing between two wires such as 72, 74, and 76 that comprise printed circuits, center-to-center | 0.1 in. |
| Number of recorded tracks comparable to tracks 78 – 87 | 25 |
| Width of each recorded track | 0.1 in. |
| Distance between edges of adjacent recorded tracks | 0.1 in. |

Figure 11:
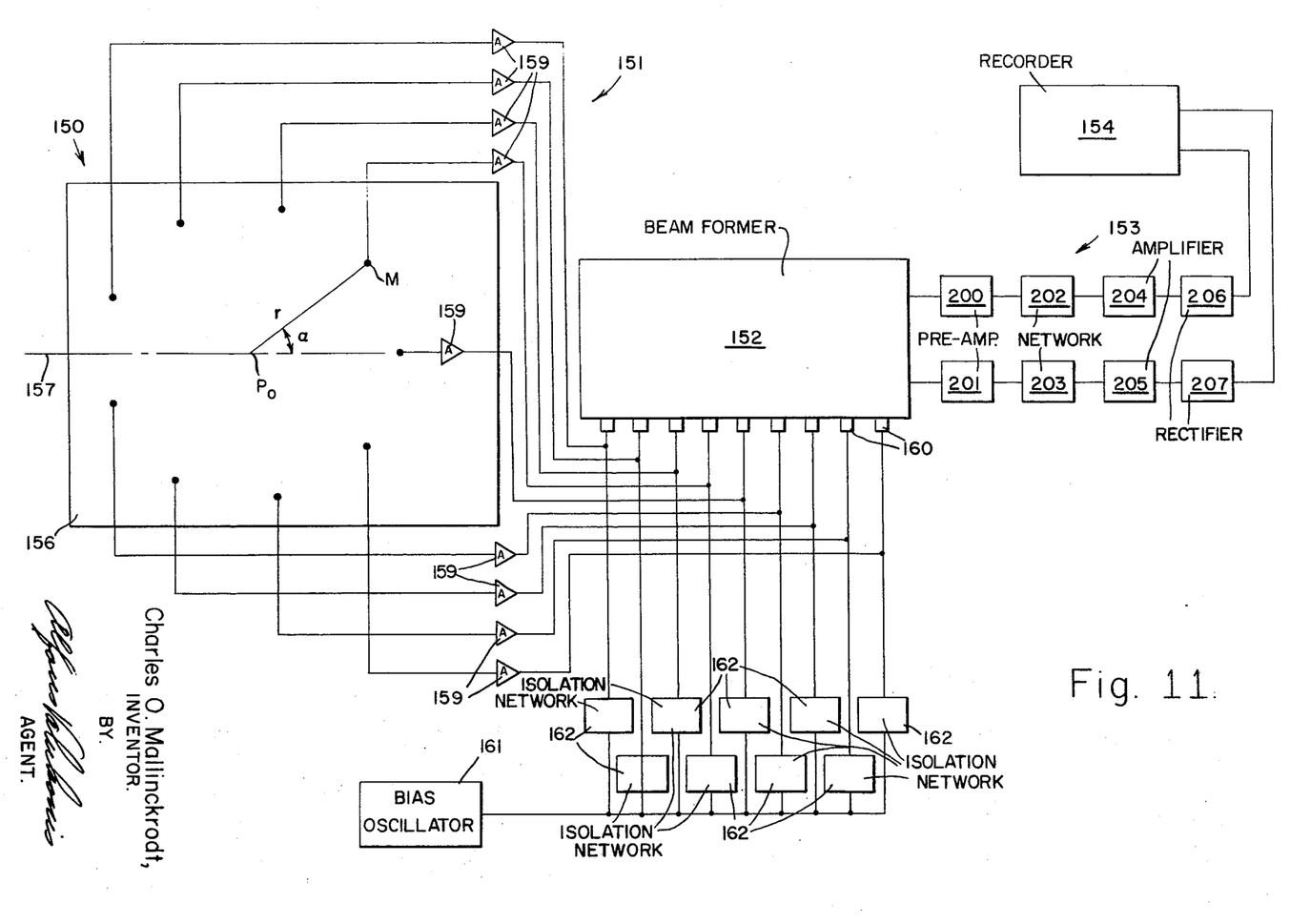
FIG. 11 is a showing in block diagram of the apparatus of another embodiment of the present invention.

Referring to FIG. 11 wherein there is shown another embodiment of the present invention, the numeral 150 designates an array of transducers which is connected by means of an input circuit 151 to a beamformer 152 with an output circuit 153 connecting the beamformer to a recorder 154. In this embodiment, in addition to being able to control or steer the beam in elevation by varying the speed of rotation of a magnetic recording drum, the beamformer is capable of controlling or steering the beam in azimuth by moving the printed circuit arrangement in a direction transverse to the recording tracks.

The array 150 consists of a plurality of transducers shown as dots uniformly spaced in a circle lying in the plane 156 of the drawing. A dashed reference line 157 in the plane 156 of the array is shown as passing through the center $P_o$ of the circle and a reference transducer of the array. The radius r in the plane 156 connects the center point $P_o$ of the circle with one of the transducers designated as M. The angle designated a is the angle between the radius r and the reference line 157. The transducers illustrated are shown as being nine in number but it is to be understood, as will hereinafter be more clearly apparent, that the transducers could be any desired number.

Figure 12:
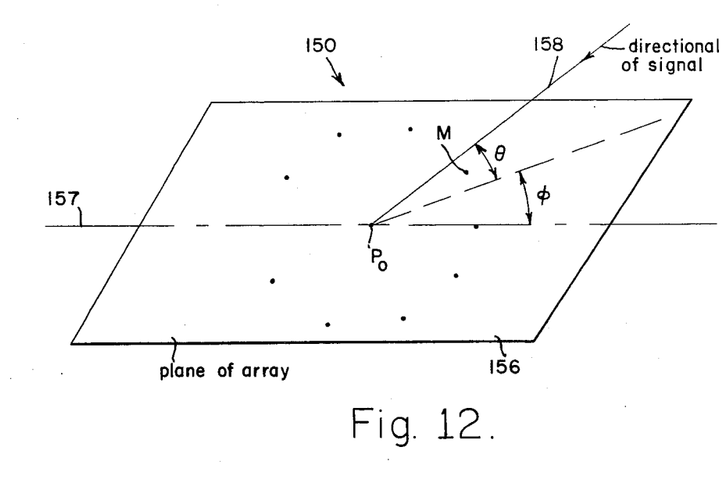
FIG. 12 is a perspective view showing of the relationship of the transducer array of the apparatus of FIG. 11 and an incoming signal.

Referring to FIG. 12, the direction of travel of an exemplary received acoustic signal is represented by the vector 158. The elevation angle of the signal 158 with respect to plane 156 is represented by $\theta_1$, and $\phi$ is the azimuth angle of the signal as defined by the reference line 157 and the line 159 which is formed by a plane through the signal line 158 perpendicular to the plane 156.

Figure 13:
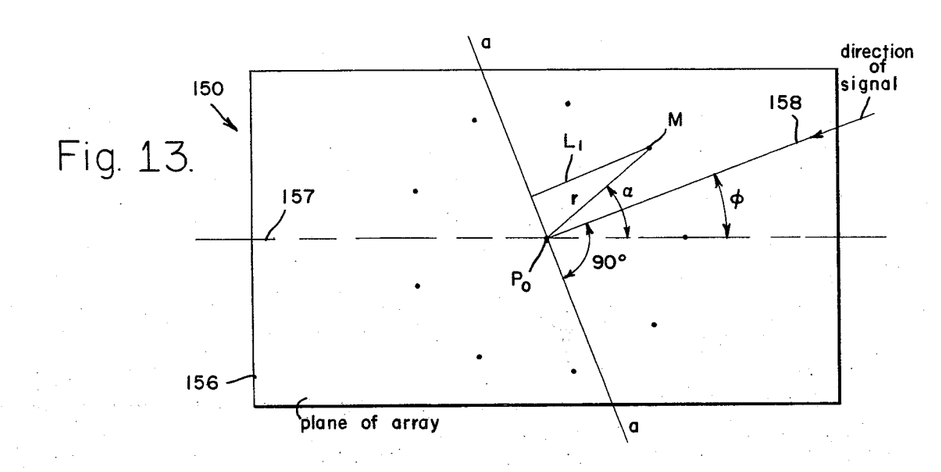
FIG. 13 is a plan view showing of the relationship of the transducer array of the apparatus of FIG. 11 and the incoming signal of FIG. 12.

Viewing downwardly the plane 156 of the array 150, as in FIG. 13, the line a—a is the line of intersection of the wavefront of the signal 158 with the plane 156, and $L_1$ is the distance from the transducer M to the line a—a in the plane 156 where $$L_1 = r \cos (\alpha - \phi)$$

(12).

Figure 14:
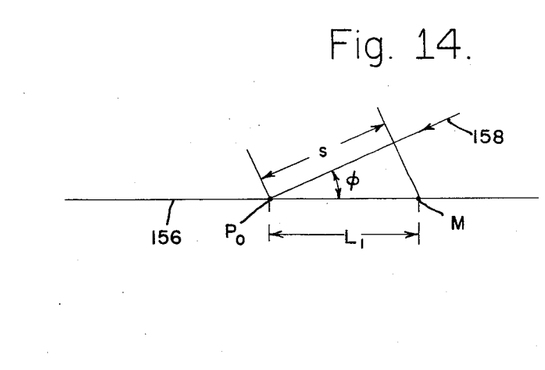
FIG. 14 is an elevation view showing of the relationship of the transducer array of the apparatus of FIG. 11 and the incoming signal of FIGS. 12 and 13.
Figure 15:
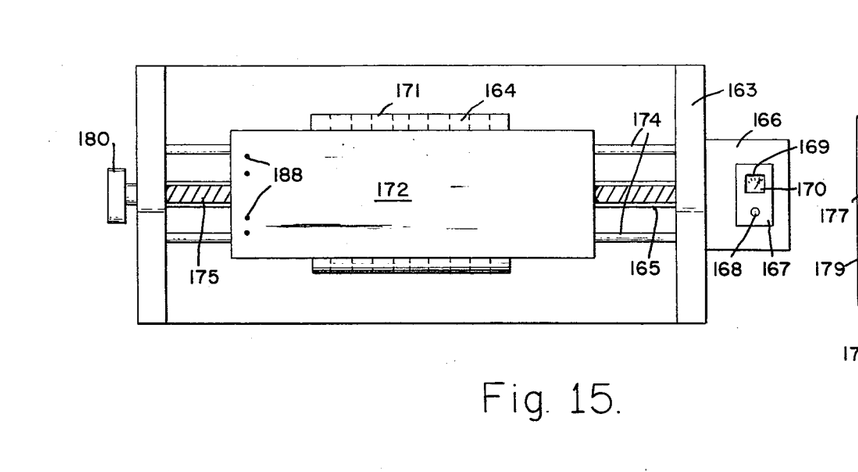
FIGS. 15, 16, and 17 show plan, side and end views, respectively, of the novel beamformer of the apparatus of FIG. 11.
Figures 16, 17:
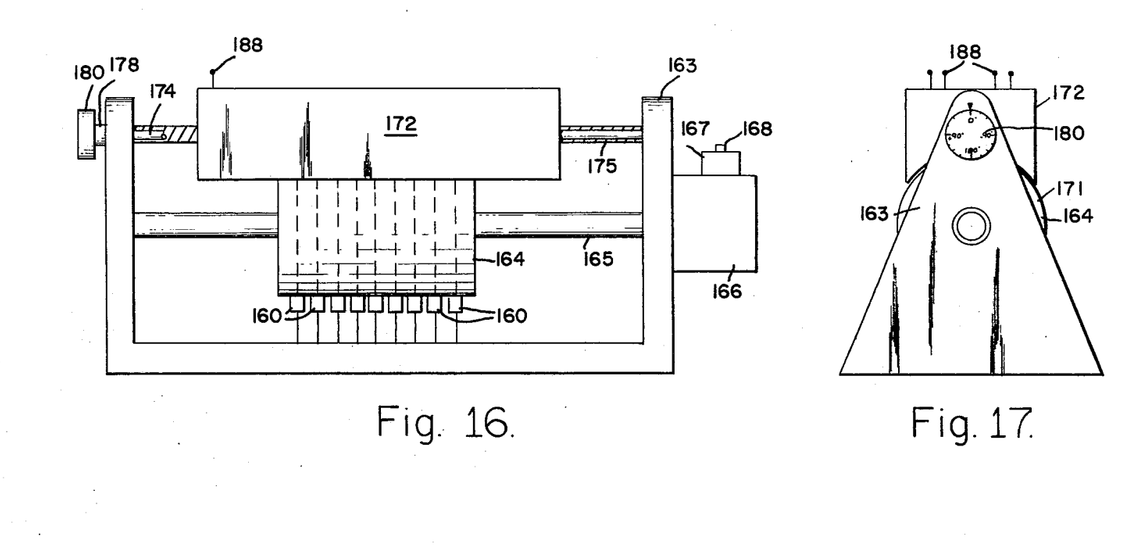

When the arrangement of FIG. 13 is viewed sidewise, along a line of line of sight parallel to the line a—a, as in FIG. 14, the distances that the signal 158 must travel in progressing from the tranducer M to the point $P_o$ is given by $$s = L_1 \cos \theta_1$$
$$s = r \cos (\alpha - \phi) \cos \theta_1$$

(13).

The time $T_a$, the signal 158 at transducer M, or any other transducer of the array 150, is delayed relative to the signal at the center point $P_o$, is obtained by reversing the sign of equation (13) and dividing by c, the velocity of sound in the signal transmission medium, for example, sea water to give $$T_a = r/c \cos (\alpha - \phi) \cos \theta_1$$

(14).

The input circuit 151 has components similar to the input circuit 12 of the embodiment of the invention depicted in FIGS. 1 – 7 and consists of a plurality of amplifiers 159 each being connected to receive the input of one of the transducers and provides an output to one of a plurality of recording heads 160 of the beamformer 152. The oscillator 161 supplies AC biasing current to each recording head as hereinbefore described with reference to the embodiment of FIGS. 1 – 7. Isolation networks 162, similar to the networks 32, are provided between the oscillator 161 and the recording heads 160.

FIGS. 15, 16, 17 and 18 show the details of the beamformer 152 of the second embodiment of the invention. A base 163 has a cylindrical drum 164 rotatably supported by means of a shaft 165 extending through the center of the drum 164 and mounted in the base 163. The drum 164, like the drum 36 of the first embodiment, is a metallic cylinder having a thin layer coating of magnetic recording material. A motor 166 supported on the base drives the drum 164 through the shaft. A speed controller 167 is mounted on the motor and has a manually adjustable member 168 for controlling the speed of the motor. A speed indicator 169 is provided which has a dial 170 calibrated in terms of motor revolutions per second.

Magnetic recorders 160 are equal in number to the transducers in the array. As illustrated, the number of recorders 160 is nine in number. The recorders 160 are similar to the recorders 28 and are mounted on the base 163 to provide a clearance of several mils between their pole pieces and the drum surface 171.

A block of insulating material 172 similar to the block 50 has a curved lower surface 173 such that it conforms to the drum surface 171. The block 172 is slidingly mounted for movement parallel to the longitudinal axis of the drum 164 by means of guide rods 174 and 175 which are positioned through longitudinal apertures 176 and 177, respectively, in the block, and secured at their ends in the base 163. Longitudinal movement of the block 172 is accomplished and controlled by means of a threaded shaft 178 in engagement with a threaded aperture 179 in the block. A combination control knob and azimuth angle dial 180 is provided on one end of the shaft 178 while the other end is suitably positioned for rotatable movement in the base 163. A pair of printed circuits 185 and 186 are mounted in the surface 173 of the block such that there is clearance between the printed circuits and the drum surface 171 to prevent physical contact. A plurality of holes 187 in the curved undersurface 173 through the block 172 provide a means for leading the ends of the printed circuits 185 and 186 to terminals 188 on the top of the block.

Figure 18:
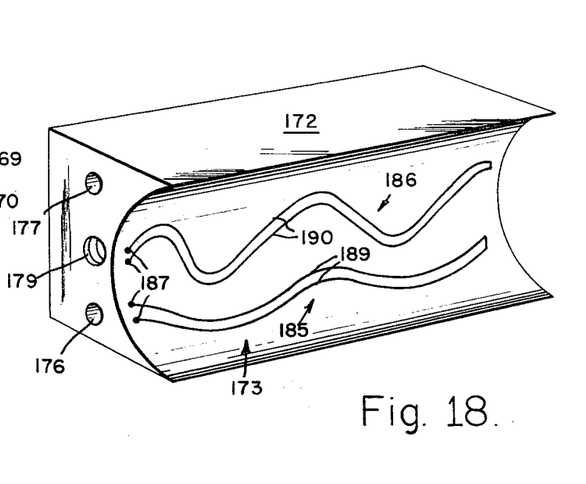
FIG. 18 is a perspective view showing details of the block and printed circuits of the beamformer of FIGS. 15 – 17.
Figure 19:
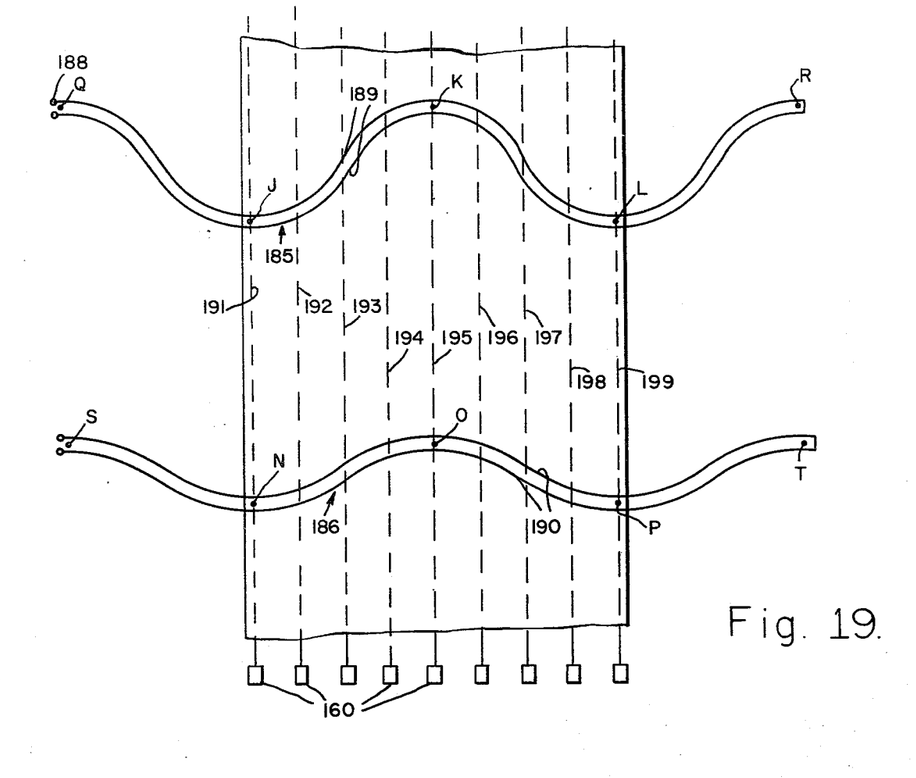
FIG. 19 is an enlarged diagram showing in plan of the relationship of the drum and printed circuits of the beamformer of FIGS. 15 – 18.

The two printed circuits 185 and 186, as shown in FIGS. 18 and 19, represent the elevation angles 58° and 71.5°, respectively, and are suitably bonded to the curved undersurface 173 of the block. It will be appreciated that the number of printed circuits employed could be other than two in number, the actual number employed depending on the number of beams that it is desired to simultaneously form. The printed circuits 185 and 186 consist of loops of wire having pairs of similar substantially parallel sinusoidally curved sides 189 and 190, respectively, which are connected together at one end and connected to the terminals 188 at the other end. Each of the printed circuits spans the drum 164 to traverse all of the equally spaced recorded tracks 191 – 199. FIG. 19 shows a portion of the printed circuit 185 traversing magnetic tracks 191, 195, and 199 such that points J, K, and L, respectively, define points of intersection of the tracks and an imaginary line equidistant from the sides 189. The points N, O, and P, respectively, indicate similar points for a similar portion of the printed circuit 186. As in the embodiment of FIG. 1, the printed circuits 185 and 186 each serves to scan all of the magnetic tracks 191 – 199 for transducer signals produced by input signals and to have induced therein an output voltage representing an input signal received at a predetermined angle $\theta_1$ by the array 150. In order for the output signal to be a maximum, each of the delayed magnetic transducer signals recorded on the tracks representing the input signal at a predetermined angle of elevation $\theta_1$ must be made to induce its share of the output signal voltage at the same time as the other transducer signals. To this end, as in the embodiment of FIGS. 1 – 7, additional electrical time delay $T_e$ must be provided for each of the differently acoustically time delayed transducer signals to achieve this time equalization according to the expression $$T_e = T_m - T_a$$

(14a)

where $T_m$ is an arbitrary fixed value great enough so that $T_e$ is positive for all values of $T_a$. From equation (14) equation (14a) can be rewritten in general form as $$T_e = T_m + r/c \cos(\alpha - \phi) \cos\theta_1$$

(15)

Physically the above required time equalization in this embodiment of the invention is achieved by locating each of the points J, K, L, N, O, and P along its track at a distance $Y_2$ from a recorder 160 which can be obtained from $$Y_2 = v_1 T_m + v_1 r/c \cos(\alpha - \phi) \cos\theta_1$$

(16)

where $v_1$ is the velocity of the surface 171 of the drum 164.

In order to achieve controlling or steering in azimuth of the beams formed by the printed circuits 185 and 186 by moving the printed circuits in either direction transverse to the recording tracks, the printed circuits are formed to provide additional portions defined by the points J, K, L, and the points N, O, P, of the respective printed circuits 185 and 186. To this end, for the printed circuit 185, a portion of printed circuit Q, J is provided which is similar to the portion K, L. In like manner a portion L, R is provided to the circuit 185 which is similar to the portion J, K. Similarly additional portions of printed circuits S, N and P, T, similarly configured to the portions O, P and N, O, respectively, are provided to the printed circuit 186.

It will be apparent that with the printed circuits 185 and 186 being so configured and so positioned with respect to the equally spaced tracks 191 – 199, that the distance between the centers of the two outside tracks 191 and 199 on the drum surface is substantially equal to the distance between points J and L of the printed circuit 185, and also points N and P of the printed circuit 186, which are located at consecutive peaks in one direction of the sinusoidally curved printed circuits, respectively.

The output circuit 153 is similar to the output circuit 16 of the embodiment illustrated in FIGS. 1 – 7, but differs in that only two channels are provided to the recorder 154, because only two printed circuits 185 and 186 are utilized. The output circuit consists of a pair of preamplifiers 200 and 201 having their inputs connected to the terminals 188 of the printed circuits 185 and 186, respectively. The outputs of the preamplifiers 200 and 201 are provided to equalizing networks 202 and 203, through amplifiers 204 and 205, rectifier circuits 206 and 207, and then to the chart recorder 154.

The chart recorder 154 is similar to the recorder 18 and receives each of the signals provided from the rectifiers 206 and 207 to drive styli thereon in a manner similar to the styli 122, 124, 126 of the recorder 18 to provide darkening of traces on a moving chart to indicate the presence of signals at the elevation angles of 58° and 71.5°.

In operation of the embodiment of FIGS. 15 – 18, it will be appreciated that because of the relative motion between the track 191 and the printed circuit 185, for example, due to the rotation of the drum 164, an output voltage $V_2$ similar to the output voltage $V_1$ given by equation (11) for the embodiment of FIGS. 1 – 7, will be induced in the printed circuit 185 according to the equation $$V_2 = -2 E_1 \sin[2\pi v_1/\lambda_1 (t - Y_2/v_1)](\sin \pi a_1/\lambda_1)(2\pi I_1 k_2/\lambda_1)(e^{-2\pi h_1/\lambda_1})$$

(17)

where $E_1$ is the peak voltage induced in either wire 189; $v_1$ is the velocity of the drum surface 171; $\lambda_1$ is the wavelength of the recorded signal as measured on the surface of the drum 164; t is time in seconds; $Y_2$ is the distance of point J from the recorder along track 191 obtained from equation 16; $I_1$ is the current in recorder 160; $k_2$ is a constant having a predetermined value dependent on the desired parameters of an operational embodiment of the beamformer of FIGS. 15 – 18; $a_1$ is the distance between the two printed circuit wires 189 center to center, and is approximately equal to one half the wavelength $\lambda_1$; and $k_1$ is the distance between the printed circuit 185 and the drum surface 171.

Simultaneously with the induction of a voltgage $V_2$ in the printed circuit 185 there will be additional voltages induced by the magnetic tracks 192 – 199, resulting, as before, in an algebraic summation of voltages representing the recorded transduced signals produced by all of the transducers of the array 150 in response to a signal received at an elevation angle of 58°. The algebraically summed voltages are then amplified by the preamplifier 200, frequency compensated by equalizer 202, amplified again by amplifier 204, rectified by rectifier 206, and applied to a stylus of the recorder 154 to darken the moving chart of the recorder in a well known manner to record the reception of an input signal at an elevation angle of 58°.

Similar induction of algebraically summed voltages representing recorded transducer signals produced by all of the transducers of the array 150 in response to an input signal received at an elevation angle of 71.5° would be induced in the printed circuit 186. Similarly the signal induced in the printed circuit 186 would be passed through preamplifier 201, equalizer 203, and rectifier 207 to the appropriate stylus on recorder 154 to register the reception of a signal at an elevation of 71.5° on the moving chart of the recorder.

Figure 20:
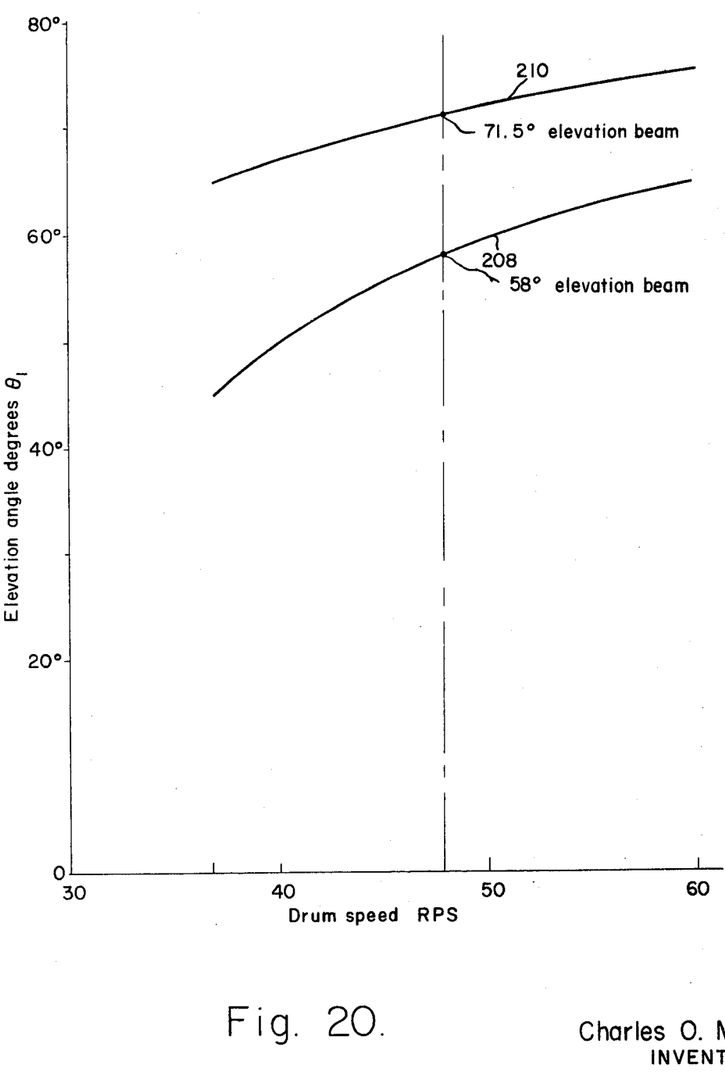
FIG. 20 shows graphical representation of how the beam elevation angles obtained with the printed circuits of the beamformer of FIGS. 15 – 19 vary with drum speed.

FIG. 20 shows by means of graphs how beam steering or searching in elevation can be achieved with the apparatus of the embodiment of the invention shown in FIGS. 11 – 19. The numeral 208 designates a curve which represents how the beam elevation angle of 58°, which is formed for a rotational speed of 48 revolutions per second of the drum 164 by the printed circuit 185, varies with drum speed. Numeral 210 designates a similar curve but it represents how the elevation angle of 71.5°, also formed for a rotational drum speed of 48 revolutions per second by the printed circuit 186, varies with drum speed. Referring to curve 208, it can be seen that decreasing the rotational speed of drum 164 to values less than 48 revolutions per second serves to form beams at elevation angles less than 58°. Similarly, increasing the drum speed to values above 48 revolutions per second results in increased beam angles. It can be seen from curve 210 that decreasing and increasing the rotational speed of the drum 164 to values below and above 48 revolutions per second results in the formation of beams at angles less than and more than 71.5°, respectively.

Search in azimuth angle $\phi$ can be accomplished by the embodiment of FIGS. 11 – 20 simply by moving the block 172 and the printed circuits 185 and 186 in a transverse direction relative to the recorded tracks 191 – 199 of the drum 164. For example, rotation of the control knob 180 in a clockwise direction to move the points Q and S (FIG. 19) of the printed circuits 185 and 186 to positions previously occupied by the points J and N serves to effect a 180° search in azimuth angle in one direction, and rotation in the counterclockwise direction of the knob 180 to position the points R and T in the positions previously occupied by L and P, respectively, results in a 180° azimuth search in the opposite direction, thus providing a combined total of 360° of azimuth search which can be conveniently read from the combination control knob and azimuth angle dial 180.

The following table provides the dimensions, parameters, and characteristics of an operational embodiment of the scanning system of FIGS. 11 – 20.

TABLE II

| | |
|---|---|
| Number of transducers | 36 |
| Diameter of array 150 | 7.1 ft. |
| Number of beams to be formed simultaneously at elevation angles of 58° and 71.5° | 2 |
| Center frequency of the generated acoustic signal | 4 Kc |
| Wavelength of the generated acoustic signal at 4 Kc, where velocity of acoustic waves in sea water is 5000 ft. per second | 1.25 ft. |
| Bandwidth of the generated acoustic signal | 400 cps. |

TABLE II-Continued

| | |
|---|---|
| Distance between centers of adjacent transducers | 0.620 ft. |
| Diameter of drum 164 | 4.25 in. |
| Speed of rotation of drum 164 | 48 rps. |
| Velocity of drum surface 171 | 640 in./sec. |
| Wavelength of recorded 4.0 Kc. signal, as measured on the drum surface 171 | 0.16 in. |
| Clearance between the printed circuits 185 and 186 and surface 171 of drum 164 | 0.002 in. |
| Width of printed circuit wires 189 and 190 | 0.010 in. |
| Thickness of printed circuit wires 189 and 190 | 0.004 in. |
| Spacing between two wires such as 189 and 190 that comprise the printed circuits 185 and 186, center to center | 0.08 in. |
| Number of recorded tracks comparable to tracks 191 – 199 | 36 |
| Distance between edges of adjacent recorded tracks | 0.1 in. |
| Width of each recorded track | 0.1 in. |

Changes may be made in the combination and steps and procedures, as well as parts or elements, as heretofore set forth in the specification and shown in the drawing without departing from the spirit and scope of the invention as defined in the appended claims.

The embodiments of the invention in which an exclusive property or privilege is claimed are defined as follows:

1. A scanning system comprising in combination:
   an array of transducers for producing transducer signals in response to input signals transmitted through a medium;
   beamformer means responsive to said transducer signals for generating a selected number of output signals, said output signals each representing said transducer signals produced by one of said input signals, said beamformer means comprising a recording medium, magnetic recording means for recording said transducer signals, means for moving said recording medium adjacent said recording means at a predetermined speed to produce magnetic tracks of said transducer signals, and magnetic reproducer means scanning said tracks for generating said selected number of output signals, said magnetic reproducer means comprising printed circuit means having loops of electric conductor material, said loops each having a pair of sides spanning said tracks and being of a number equal to the number of said output signals.

2. A scanning system as set forth in claim 1 further comprising means for displaying said output signals.

3. A scanning system as set forth in claim 1 further comprising means for frequency compensating said transducer signals.

4. A scanning system as set forth in claim 1 wherein said array comprises a line array of transducers.

5. A scanning system as set forth in claim 1 wherein said array comprises a planar array of transducers.

6. A scanning system as set forth in claim 5 wherein said planar array comprises a circular arrangement of transducers.

7. A scanning system as set forth in claim 1 said beamformer means further comprising means for moving said magnetic reproducer means laterally with respect to said magnetic tracks.

8. A scanning system as set forth in claim 1, wherein said output signals each have an instantaneous amplitude equal to the algebraic sum of the instantaneous amplitudes of said transducer signals produced by one of said input signals.

9. A scanning system as set forth in claim 1 wherein the sides of each pair of sides are substantially parallel and are spaced from each other a distance approximately equal to one half the wavelength of said recorded transducer signals.

10. A scanning system as set forth in claim 9 wherein said sides of each pair of sides traverse said tracks to define points of intersection of said tracks and a line located equidistant from said sides, each of said points of intersection being located a predetermined distance from said magnetic recording means along one of said tracks.

11. A scanning system as set forth in claim 10 wherein the sides of each pair of sides are substantially straight in spanning all of said tracks.

12. A scanning system as set forth in claim 11 wherein said array of transducers comprises a line array of transducers having a reference transducer at one end, and said predetermined distances each being obtained from the equation $$Y_1 = v(T_m - x/c \sin \theta)$$

$v$ is the velocity of said recording medium, $T_m$ is an arbitrary constant, $x$ is the distance that a transducer of said array is located from said reference transducer, $c$ is the velocity of said input signals through said medium, and $\theta$ is the elevation angle formed by one of said input signals with said line array of transducers.

13. A scanning system as set forth in claim 10 wherein the sides of each pair of sides form a substantially sinusoidal curve in spanning said tracks.

14. A scanning system as set forth in claim 13 wherein said array of transducers comprises a planar circular array of transducers having a reference transducer, and said predetermined distances each being obtained from the equation $$Y_2 = v_1 T_m + v_1 r/c \cos (\alpha - \phi) \cos \theta_1$$

where $v_1$ is the velocity of said recording medium, $T_m$ is an arbitrary constant, $c$ is the velocity of said input signals through said medium, $r$ is the radius of said circular array of transducers, $\alpha$ is the angle formed by a reference line drawn through said reference transducer and the center of said circular array and a radius drawn through one of said transducers, $\phi$ is the azimuth angle formed by one of said input signals with said reference line, and $\theta_1$ is the elevation angle formed by said one input signal with the plane of said array.

15. A scanning system as set forth in claim 13 wherein the distance between the centers of the two outside tracks of said magnetic tracks is substantially equal to the distance between consecutive peaks in one direction of said sinusoidal curve.

16. A beamformer for a scanning system comprising:

a recording medium, a magnetic recording means for recording transducer signals produced by an array of transducers in response to input signals, means for moving said recording medium adjacent said recording means at a predetermined speed to produce magnetic tracks of the transducer signals, and magnetic reproducer means scanning said tracks for generating a selected number of output signals, said output signals each representing the transducer signals produced by one of the input signals, said magnetic reproducer means comprising printed circuit means having loops of electric conductor material, said loops each having a pair of sides spanning said tracks and being of a number equal to the number of said output signals.

17. A beamformer for a scanning system as set forth in claim 16 wherein said moving means comprises variable speed motor means.

18. A beamformer for a scanning system as set forth in claim 16 wherein said output signals each have an instantaneous amplitude equal to the algebraic sum of the instantaneous amplitudes of said transducer signals produced by one of said input signals.

19. A beamformer for a scanning system as set forth in claim 16 wherein the sides of each pair of sides are substantially parallel and are spaced from each other a distance approximately equal to one half the wavelength of the recorded transducer signals.

20. A beamformer for a scanning system as set forth in claim 19 wherein said sides of each pair of sides traverse said tracks to define points of intersection of said tracks and a line located equidistant from said sides, each of said points of intersection being located a predetermined distance from said magnetic recording means along one of said tracks.

21. A beamformer for a scanning system as set forth in claim 20 wherein the sides of each pair of sides are substantially straight in spanning all of said tracks.

22. A beamformer for a scanning system as set forth in claim 20 wherein the sides of each pair of sides form a substantially sinusoidal curve in spanning said tracks.

23. A beamformer for a scanning system as set forth in claim 22 wherein the distance between the centers of the two outside tracks of said magnetic tracks is substantially equal to the distance between consecutive peaks in one direction of said sinusoidal curve.

24. A beamformer for a scanning system as set forth in claim 22 further comprising means for moving said magnetic reproducer means laterally with respect to said tracks.

* * * * *